United States Patent
Nakagawa et al.

(10) Patent No.: US 12,412,061 B2
(45) Date of Patent: **\*Sep. 9, 2025**

(54) ELECTRONIC COMPONENT MANAGEMENT METHOD, AND HOUSING BODY FOR ELECTRONIC COMPONENTS

(71) Applicant: Murata Manufacturing Co., Ltd., Nagaokakyo (JP)

(72) Inventors: Kiyoyuki Nakagawa, Nagaokakyo (JP); Yasuhiro Shimizu, Nagaokakyo (JP); Nobuto Yamada, Nagaokakyo (JP); Naoto Ikeda, Nagaokakyo (JP)

(73) Assignee: MURATA MANUFACTURING CO., LTD., Kyoto (JP)

(\*) Notice: Subject to any disclaimer, the term of this patent is extended or adjusted under 35 U.S.C. 154(b) by 0 days.

This patent is subject to a terminal disclaimer.

(21) Appl. No.: 18/206,129

(22) Filed: Jun. 6, 2023

(65) Prior Publication Data

US 2024/0086673 A1  Mar. 14, 2024

Related U.S. Application Data

(63) Continuation of application No. PCT/JP2021/038085, filed on Oct. 14, 2021.

(30) Foreign Application Priority Data

Dec. 10, 2020  (JP) ................ 2020-205229

(51) Int. Cl.
  *G06K 19/07* (2006.01)
  *G05B 19/418* (2006.01)
  *G06K 19/077* (2006.01)
(52) U.S. Cl.
  CPC ..... *G06K 19/0723* (2013.01); *G05B 19/4183* (2013.01); *G06K 19/07773* (2013.01)

(58) Field of Classification Search
  CPC ......... G06K 19/0723; G06K 19/07773; G05B 19/4183; G05B 19/418; Y02P 90/02
  See application file for complete search history.

(56) References Cited

U.S. PATENT DOCUMENTS

2003/0102367 A1\*  6/2003  Monette ........... G05B 19/41865
                                                            235/376
2005/0224590 A1\*  10/2005  Melngailis ............. G06K 1/126
                                                            235/492

(Continued)

FOREIGN PATENT DOCUMENTS

CN    102663595 A      9/2012
JP    H07300185 A   \*  4/1994

(Continued)

OTHER PUBLICATIONS

JP H07300185A—Case for Chiplike Parts in Bulk, 7 pages. (Year: 2024).\*

(Continued)

*Primary Examiner* — Tuyen K Vo
(74) *Attorney, Agent, or Firm* — Keating & Bennett, LLP (57) ABSTRACT

An electronic component management method includes manufacturer-side steps including storing electronic components in a housing body that includes an RFID tag, writing in the RFID tag at least one piece of manufacturer-side information related to the electronic components stored in the housing body, shipping the housing body with the manufacturer-side information written in the RFID tag, and storing the electronic components, and user-side steps including receiving the shipped housing body, reading the manufacturer-side information written in the RFID tag, a preparing an electronic circuit board, and arranging the electronic components on the electronic circuit board based on the read manufacturer-side information.

16 Claims, 11 Drawing Sheets

(56) References Cited

U.S. PATENT DOCUMENTS

| | | | | |
|---|---|---|---|---|
| 2007/0096914 A1* | 5/2007 | Baba | ............ | G06K 19/0739 |
| | | | | 340/572.3 |
| 2009/0266740 A1* | 10/2009 | Kasama | ............ | H01L 21/67346 |
| | | | | 206/829 |
| 2012/0310397 A1* | 12/2012 | Rataul | ............ | G05B 19/4188 |
| | | | | 700/95 |
| 2016/0143129 A1* | 5/2016 | Min | ............ | H05K 1/0231 |
| | | | | 174/252 |
| 2018/0184555 A1* | 6/2018 | Rossmann | ............ | H05K 13/0084 |

FOREIGN PATENT DOCUMENTS

| | | | |
|---|---|---|---|
| JP | H09202435 A | * | 1/1996 |
| JP | 2002358494 A | | 12/2002 |
| JP | 2005277068 A | | 10/2005 |
| JP | 2005324839 A | | 11/2005 |
| JP | 2013133201 A | | 7/2013 |

OTHER PUBLICATIONS

JP H09202435A—Electronic Part Supply Device, 6 pages. (Year: 2024).*
International Search Report in PCT/JP2021/038085, mailed Dec. 28, 2021, 3 pages.
Written Opinion in PCT/JP2021/038085, mailed Dec. 28, 2021, 4 pages.
Official Communication issued in corresponding Chinese Patent Application No. 202180082160.3, mailed on Jul. 23, 2025, 9 pages.

* cited by examiner

ELECTRONIC COMPONENT MANAGEMENT METHOD, AND HOUSING BODY FOR ELECTRONIC COMPONENTS

CROSS REFERENCE TO RELATED APPLICATIONS

This application claims the benefit of priority to Japanese Patent Application No. 2020-205229 filed on Dec. 10, 2020 and is a Continuation Application of PCT Application No. PCT/JP2021/038085 filed on Oct. 14, 2021. The entire contents of each application are hereby incorporated herein by reference.

BACKGROUND OF THE INVENTION

1. Field of the Invention

The present invention relates to an electronic component management method and an electronic component housing body.

2. Description of the Related Art

Conventionally, in component manufacturers for manufacturing small electronic components, such as semiconductor chips and capacitor chips, a plurality of manufactured electronic components are stored in a single housing body, transported and stored in a factory, and shipped with the housing body to a manufacturer of assembled products. Examples of the housing body include a carrier tape in which electronic components are divided and held one by one and wound around a reel, a magazine in which electronic components are aligned and stored, a bulk case or bagging method in which electronic components are stored in a loose state, that is, in a bulk state (see, for example, Japanese Unexamined Patent Application, Publication No. 2005-324839). On the other hand, in order to perform production management of articles, there is a known technology in which an RFID tag is attached to an individual to be managed, and an RFID system that reads ID information preset in the RFID tag is used (see, for example, Japanese Unexamined Patent Application, Publication No. 2002-358494).

As the size of an electronic component is significantly reduced, it is considered that the housing body is managed in order to manage a large amount of electronic components. However, the Japanese Unexamined Patent Application, Publication No. 2005-324839 and Japanese Unexamined Patent Application, Publication No. 2002-358494 do not mention the point of the housing body being managed in various forms, and there is room for improvement.

SUMMARY OF THE INVENTION

Preferred embodiments of the present invention provide electronic component management methods and electronic component housing bodies that are each able to provide various management forms for a housing body in which a plurality of electronic components are stored, at least on the manufacturer-side.

An electronic component management method according to a preferred embodiment of the present invention includes manufacturer-side steps performed at a manufacture side facility that manufactures electronic components, the manufacturer-side steps including housing a plurality of electronic components in a housing body that includes an RFID tag, writing at least one piece of manufacturer-side information related to the plurality of electronic components housed in the housing body in the RFID tag, and shipping the housing body in which the manufacturer-side information is written in the RFID tag and the plurality of electronic components are housed, and user-side steps performed at a user-side facility that uses the plurality of electronic components, the user-side steps including receiving the shipped housing body, reading the manufacturer-side information written in the RFID tag, providing an electronic circuit board, and placing each of the plurality of electronic components on the electronic circuit board based on the read manufacturer-side information.

An electronic component housing body according to a preferred embodiment of the present invention includes a plurality of electronic components manufactured by a manufacturer housed therein, and an RFID tag that records at least one piece of manufacturer-side information related to each of the plurality of electronic components, in which the manufacturer manages product information of the plurality of electronic components based on the manufacturer-side information, and a user of the plurality of electronic components places each of the plurality of electronic components on an electronic circuit board based on the manufacturer-side information.

According to preferred embodiments of the present invention, it is possible to provide electronic component management methods and electronic component housing bodies that are each able to provide various management forms for a housing body in which a plurality of electronic components are stored, at least on the manufacturer-side.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
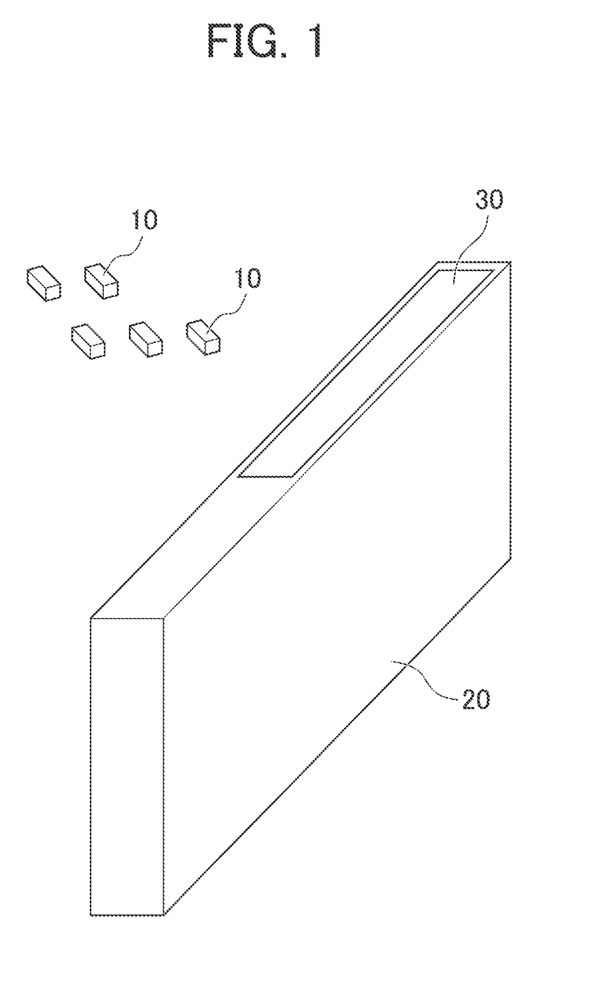
FIG. 1 is a schematical perspective view of electronic components and a bulk case according to a preferred embodiment of the present invention.
Figure 2:
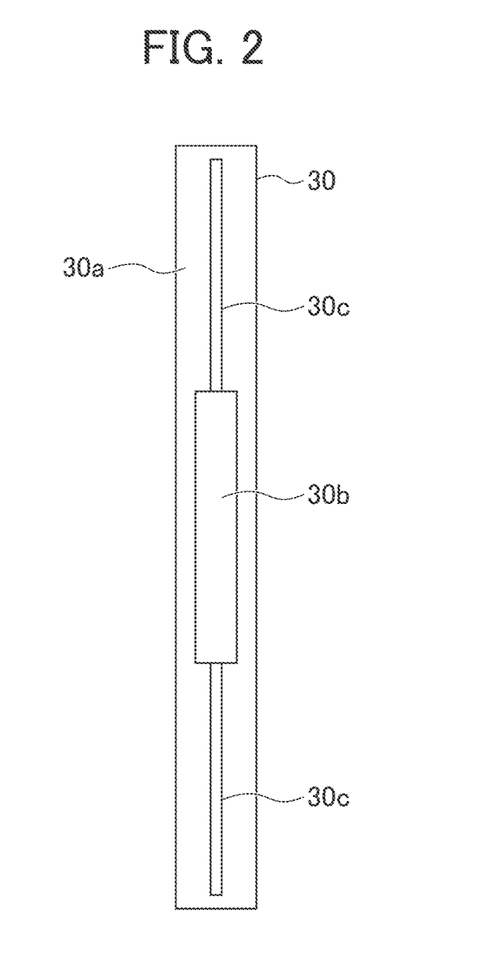
FIG. 2 is a plan view of an RFID tag according to a preferred embodiment the present invention.
Figure 3:
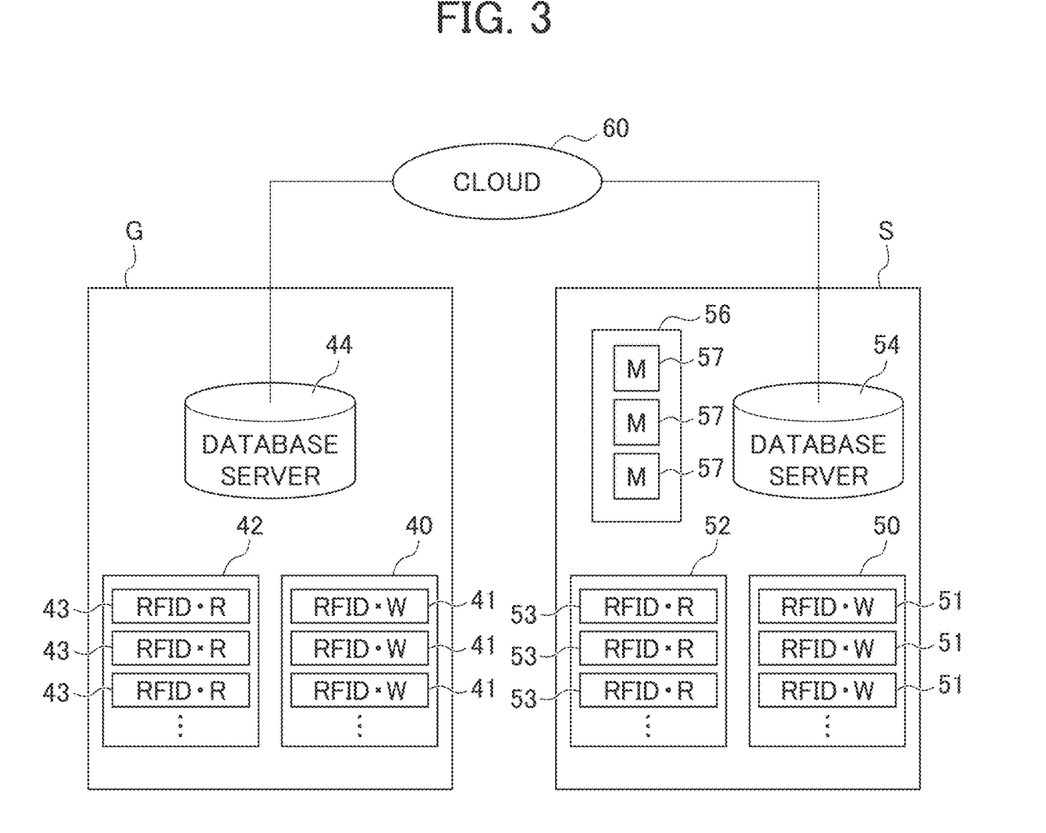
FIG. 3 is a diagram of a management method of electronic components according to a preferred embodiment the present invention, and is a diagram showing a flow of the electronic components at a component manufacturer and a manufacturer of assembled products.
Figure 4:
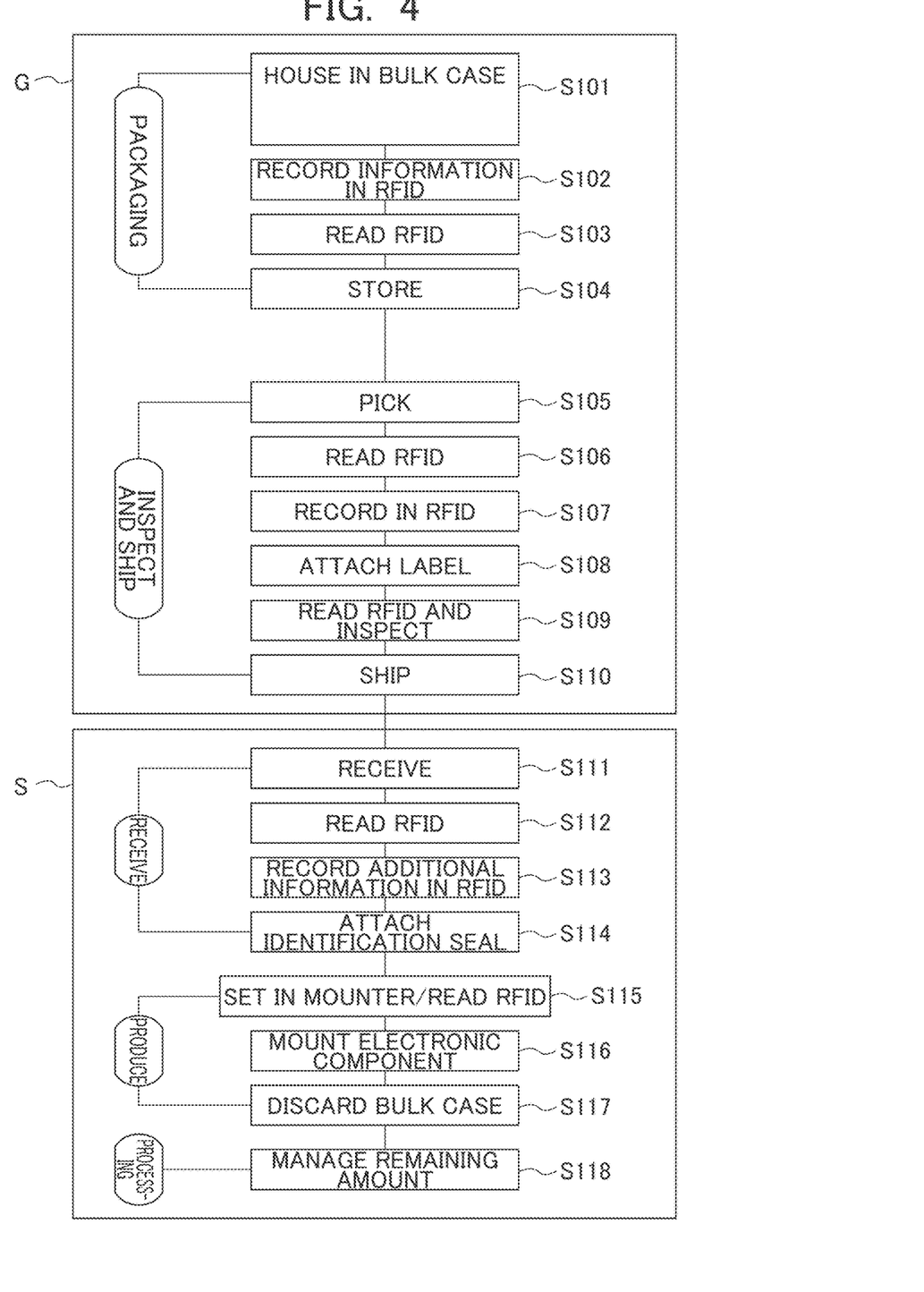
FIG. 4 shows a hardware configuration to manage electronic components provided at the component manufacturer and the manufacturer of assembled products according to a preferred embodiment the present invention.

Hereinafter, preferred embodiments of the present invention will be described with reference to the drawings. FIG. 1 shows a bulk case 20 defining and functioning as a housing body according to a preferred embodiment of the present invention and electronic components 10 housed in the bulk case 20. FIG. 2 shows an example of a configuration of an RFID tag 30 included in the bulk case 20. FIG. 3 shows a flow in which a plurality of bulk cases 20 that each house a plurality of electronic components 10 are shipped from a component manufacturer G that manufactures the electronic components 10, and the plurality of bulk cases 20 that have been shipped are shipped into a manufacturer of assembled products S for use. FIG. 4 shows a hardware configuration to manage the electronic components 10 included in each of the component manufacturer G and the manufacturer of assembled products S. The component manufacturer G is an example of a manufacturer-side facility. The manufacturer of assembled products S is an example of a user-side facility using the electronic components 10.

As shown in FIG. 1, the bulk case 20 is a box body made of a rigid body such as, for example, resin and has a thin rectangular or substantially rectangular parallelepiped shape. The bulk case 20 houses, for example, several thousands to several tens of thousands of electronic components 10 in a loose state, i.e., a bulk state. The bulk case 20 includes an RFID tag 30. The RFID tag 30 includes an elongated adhesive seal, and is attached to one end surface of the bulk case 20 or accommodated in the bulk case 20.

The electronic components 10 according to the present preferred embodiment are each, for example, a capacitor, an inductor, or the like, and are, for example, each a small rectangular or substantially rectangular parallelepiped electronic component having a longitudinal length of about 1.2 mm or less.

As shown in FIG. 2, the RFID tag 30 is a passive transponder including a rectangular or substantially rectangular sheet 30a that is made of, for example, resin and defines and functions as a base material, an RFID chip 30b including a semiconductor integrated circuit, and a plurality of antennas 30c to communicate with an external device. The RFID chip 30b and the antenna 30c are attached to the sheet 30a. The RFID tag 30 may be of a type in which the RFID chip 30b and the antenna 30c are embedded in the sheet 30a. Alternatively, the RFID tag 30 may include a power source. The RFID chip 30b includes, for example, a CPU, memory, a communication circuit, and the like. The RFID tag 30 of the present preferred embodiment has a unique ID.

The RFID tag 30 may be of a type in which memory cannot be rewritten (RO: Read Only), a type in which memory can be re-written only once (WORM: Write Once Read Many), or a type in which memory can be rewritten (R/W: Read and Write), for example. In a case where the type of the RFID tag 30 is RO or WORM, the cost is low although information to be written is smaller than that of R/W.

As shown in FIG. 3, the component manufacturer G includes a writer 40 capable of writing manufacturer-side information, which is information relating to the component manufacturer G side, to the RFID tag 30 provided in the bulk case 20, a reader 42 to read the manufacturer-side information recorded in the RFID tag 30 provided in the bulk case 20, and a database server 44. The writer 40 and the reader 42 may be integrated with each other to establish a reader/writer.

The writer 40 includes a plurality of RFID writers 41 capable of writing information in a non-contact manner. Each of the plurality of RFID writers 41 is provided at a predetermined position in the factory of the component manufacturer G. The RFID writers 41 each write and record the manufacturer-side information read from the database server 44 in the RFID tag 30 in a non-contact manner. The reader 42 includes a plurality of RFID readers 43 capable of reading manufacturer-side information in a non-contact manner. Each of the plurality of RFID readers 43 is provided at a predetermined position in the factory of the component manufacturer G. The read information of the RFID reader 43 is inputted to the database server 44.

The manufacturer of assembled products S includes a writer 50 capable of writing user-side information, which is information relating to the manufacturer of assembled products S side, to the RFID tag 30 provided in the bulk case 20, a reader 52 to read manufacturer-side information and user-side information recorded in the RFID tag 30 provided in the bulk case 20, a database server 54, and a mounter 56. When the type of the RFID tag 30 is WORM, the writer 50 may be omitted.

The writer 50 includes a plurality of RFID writers 51 capable of writing information in a non-contact manner. Each of the plurality of RFID writers 51 is provided at a predetermined position in the factory of the manufacturer of assembled products S. The RFID writers 51 each write and record predetermined user-side information in the RFID tag 30 among the user-side information held by the database server 54. The reader 52 includes a plurality of RFID readers 53 capable of reading manufacturer-side information and user-side information in a non-contact manner. Each of the plurality of RFID readers 53 is provided at a predetermined position in the factory of the component manufacturer G. The read information of the RFID reader 53 is inputted to the database server 54.

The mounter 56 includes a plurality of component supply devices 57. In each component supply device 57, the bulk case 20 is set, and the electronic components 10 in the bulk case 20 are supplied. Each component supply device 57 is a device to incorporate at least one electronic component 10 into an electronic device set.

The component manufacturer G houses the plurality of electronic components 10 manufactured in the factory in the bulk case 20, conveys and stores them, and ships them to the manufacturer of assembled products S. The manufacturer of assembled products S receives the plurality of shipped bulk cases 20 and incorporates the electronic components 10 accommodated in each of the bulk cases 20 into the electronic device set by the mounter 56.

Examples of the electronic device set to be manufactured by the manufacturer of assembled products S include information terminal devices such as smartphones and tablets, and components such as electronic circuit boards of such devices.

The database server 44 on the component manufacturer G side and the database server 54 on the manufacturer of assembled products S side can be connected to a cloud 60 on the Internet. The cloud 60 is an example of a server. A portion of the information stored in the database server 44 of the component manufacturer G side is also stored in the cloud 60 on the Internet. A portion of the information stored in the database server 54 of the manufacturer of assembled products S side is also stored in the cloud 60 on the Internet. Both the component manufacturer G and the manufacturer of assembled products S can share both pieces of information by accessing the cloud 60.

The component manufacturer G performs a packaging process, an inspection process, and a shipping process of the electronic components 10. In the manufacturer of assembled products S, a receiving process of the electronic components 10, a manufacturing process including storage and dispensing, and a processing process are performed. The flow of the electronic components 10 in the component manufacturer G and the manufacturer of assembled products S will now be described with reference to FIG. 4.

Manufacturer-side Steps at Component Manufacturer G

In the packaging process, a plurality of manufactured electronic components 10 are housed in the bulk case 20 (Step S101). In the RFID tag 30 of the bulk case 20 in which the plurality of electronic components 10 are housed, a plurality of pieces of manufacturer-side information that are set or held on the component manufacturer G side in relation to the housed electronic components 10 is recorded by a predetermined RFID writer 41 (Step S102). Examples of the manufacturer-side information recorded in the RFID tag 30 include a lot number of the electronic component 10, an amount of the electronic components 10 stored in the bulk case 20, product information related to the electronic component 10, environmental information related to the electronic component 10, an ID number of the bulk case 20, and an inspection number of the electronic component 10. Depending on the kind of the electronic component 10, for example, MSL (Moisture Sensitivity Level) is recorded. The MSL is a level indicating a risk for a phenomenon whereby volume expansion due to vaporization of moisture contained in the electronic component 10 occurs to cause a failure.

Figure 5:
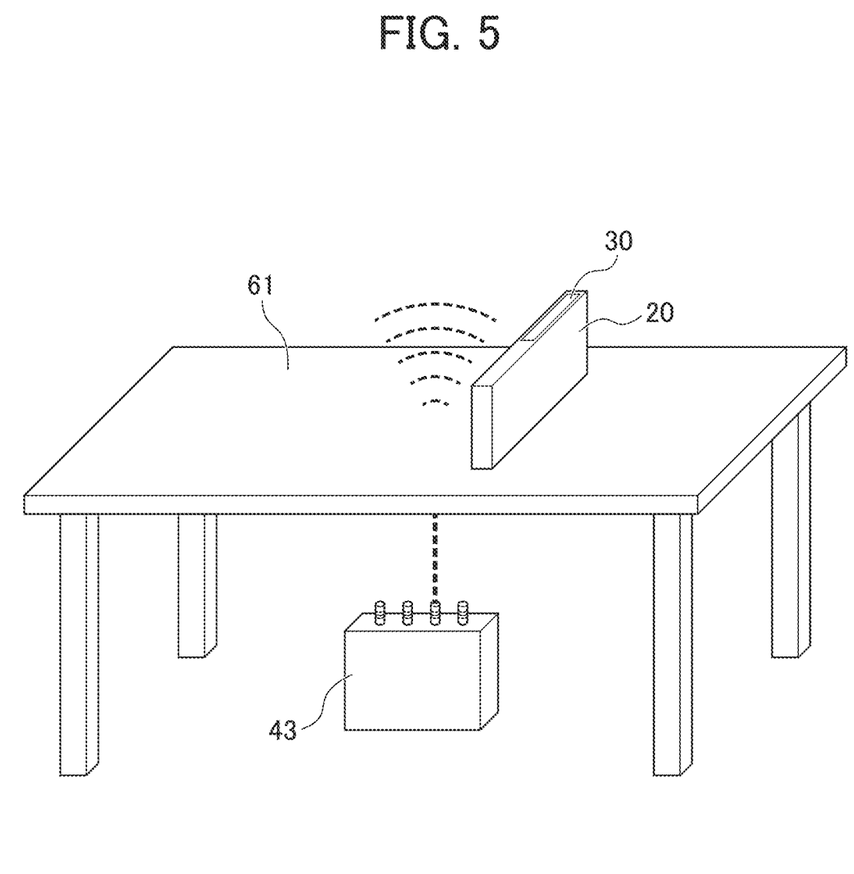
FIG. 5 is a perspective view of an example of a method of reading information of an RFID tag of a bulk case at the component manufacturer.

Next, a predetermined RFID reader 43 reads the information recorded in the RFID tag 30 of one bulk case 20, for example, reads a unique ID (Step S103). The manufacturer-side information recorded in the RFID tag 30 is associated with each bulk case 20, and the information is stored in the database server 44. In order to read the information of the RFID tag 30, for example, as shown in FIG. 5, the RFID tag 30 of the bulk case 20 placed on the table 61 is read by the RFID reader 43 placed on the table 61.

The plurality of bulk cases 20 from each of which the unique ID of the RFID tag 30 is read are carried in the factory and stored in a predetermined storage location (Step S104). Then, until the next inspection/processing process starts, for example, inventory information management, location management based on a movement path, security management, and the like are performed in the factory based on the manufacturer-side information recorded in the RFID tag 30. The inventory information management, the location management, and the security management are performed based on the reading information of the RFID reader 43 provided in the factory. The RFID reader 43 is provided at, for example, a gate in a passage, an entrance/exit port to the room, or the like, and reads manufacturer-side information recorded in the RFID tag 30 when the bulk case 20 passes through the RFID reader 43.

The inventory information management refers to managing an inventory by checking whether or not the bulk case 20 is stored in a predetermined storage location. For example, when the RFID tag 30 passes through a gate at an entrance/exit port to a predetermined storage location, the RFID tag 30 is read by the RFID reader 43 at the gate, thus confirming that the RFID tag 30 is in stock in the inventory.

The location management refers to a management in which the position of the bulk case 20 in the factory is grasped one by one by allowing the bulk case 20 carried in the factory to pass through a plurality of gates or enter and exit a predetermined room.

The security management refers to a management in which, for example, when one bulk case 20 is out of the factory in a state in which shipping is not confirmed by, for example, the RFID tag 30, it is determined that the bulk case 20 is not shipped on a regular route, and a warning is issued.

In the inspection/shipment process, the bulk case 20 is picked from the storage location (Step S105), and the manufacturer-side information recorded in the RFID tag 30 is read (Step S106).

Figure 6:
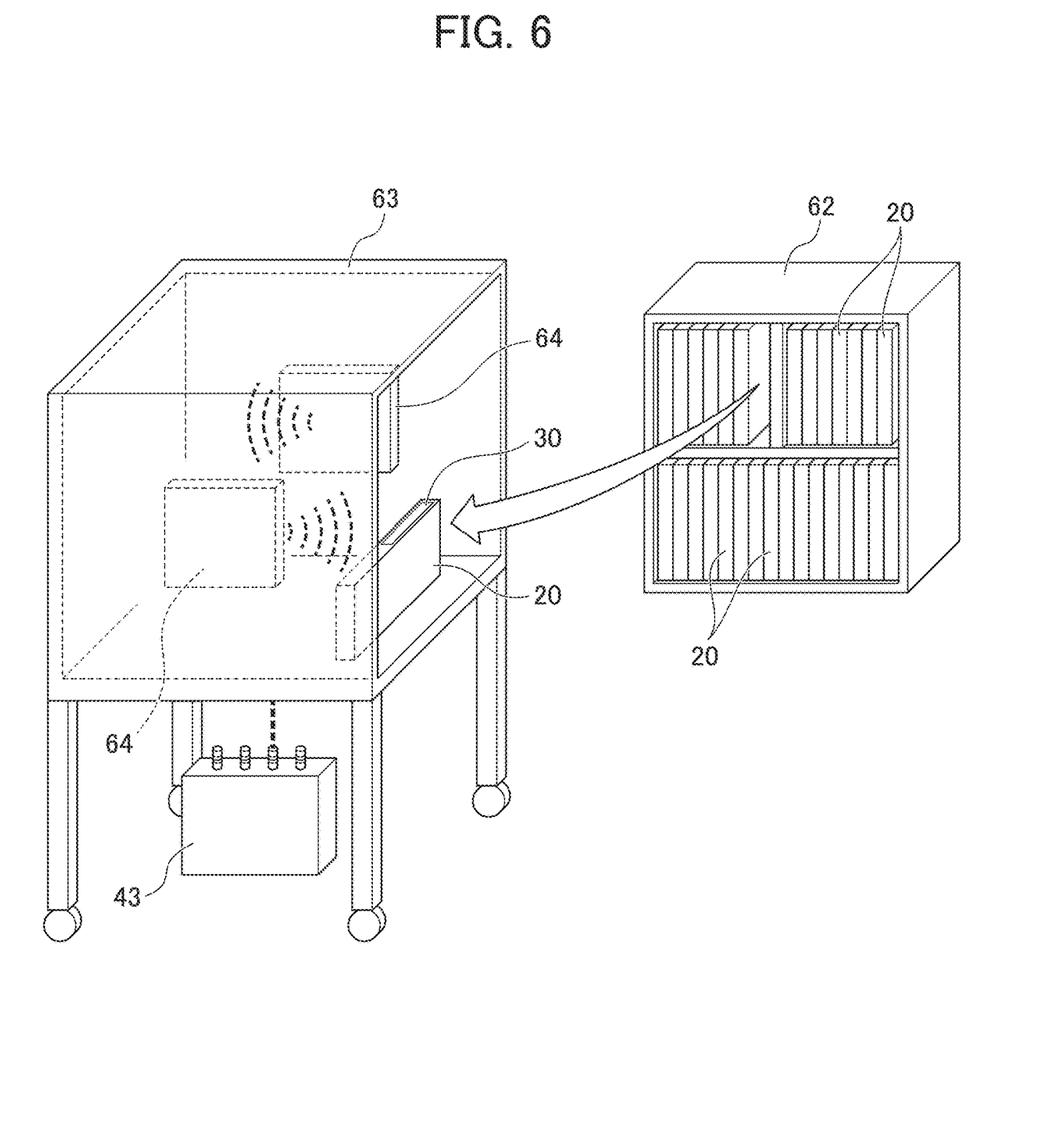
FIG. 6 is a perspective view of an example of a method of reading information of an RFID tag of a bulk case picked from a storage location at the component manufacturer.

For example, as shown in FIG. 6, the bulk case 20 is picked up from a storage place 62 such as a storage shelf and placed on a cart 63 for transportation, and on the cart 63, the manufacturer-side information recorded on the RFID tag 30 is read by the RFID reader 43 via a sensor 64. The RFID reader 43 is installed at an appropriate position of the cart 63. Thus, the fact that the bulk case 20 is shipped is inputted to the database server 44. When the bulk case 20 is spaced apart from the readable distance of the RFID reader 43, the manufacturer-side information recorded in the RFID tag 30 may be read through the sensor 64 near the bulk case 20.

In the RFID tag 30 of the picked bulk case 20, for example, the part number used by the manufacturer of assembled products S, the order number from the manufacturer of assembled products S, the factory number of the component manufacturer G, the date of manufacturing, the vendor number, and the like are written as new manufacturer-side information by the RFID writer 41 (Step S107).

Figure 7:
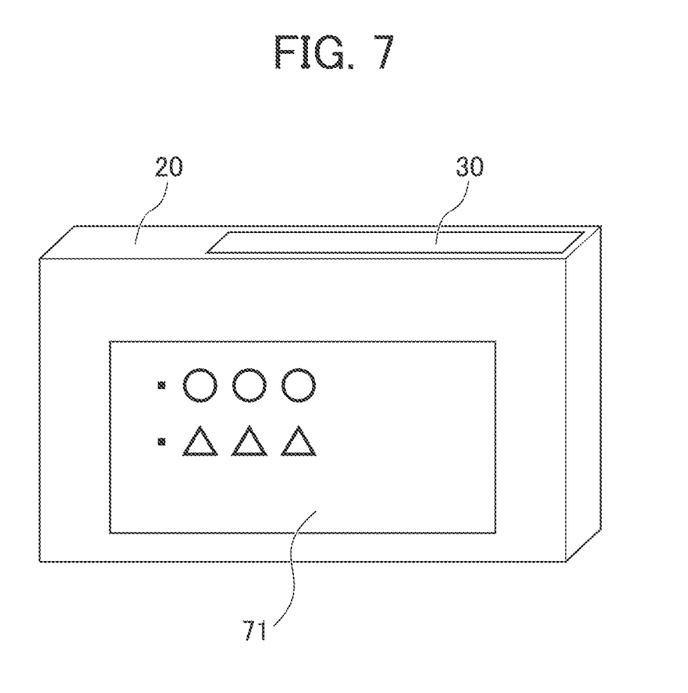
FIG. 7 is a perspective view of a bulk case to which a label is attached on the component manufacturer-side.

In the present preferred embodiment, as shown in FIG. 7, a label 71 is attached to the bulk case 20 (Step S108). On the label 71, at least one piece of manufacturer-side information among the manufacturer-side information written in the RFID tag 30, or manufacturer-side information required at the time of shipping is printed. The manufacturer-side information printed on the label 71 can be visually confirmed. The label 71 may include at least one of a one-dimensional barcode and a two-dimensional barcode associated with the manufacturer-side information.

The unique ID of the RFID tag 30 of each bulk case 20 is read by the RFID reader 43, and the bulk case 20 is inspected (Step S109).

Figure 8:
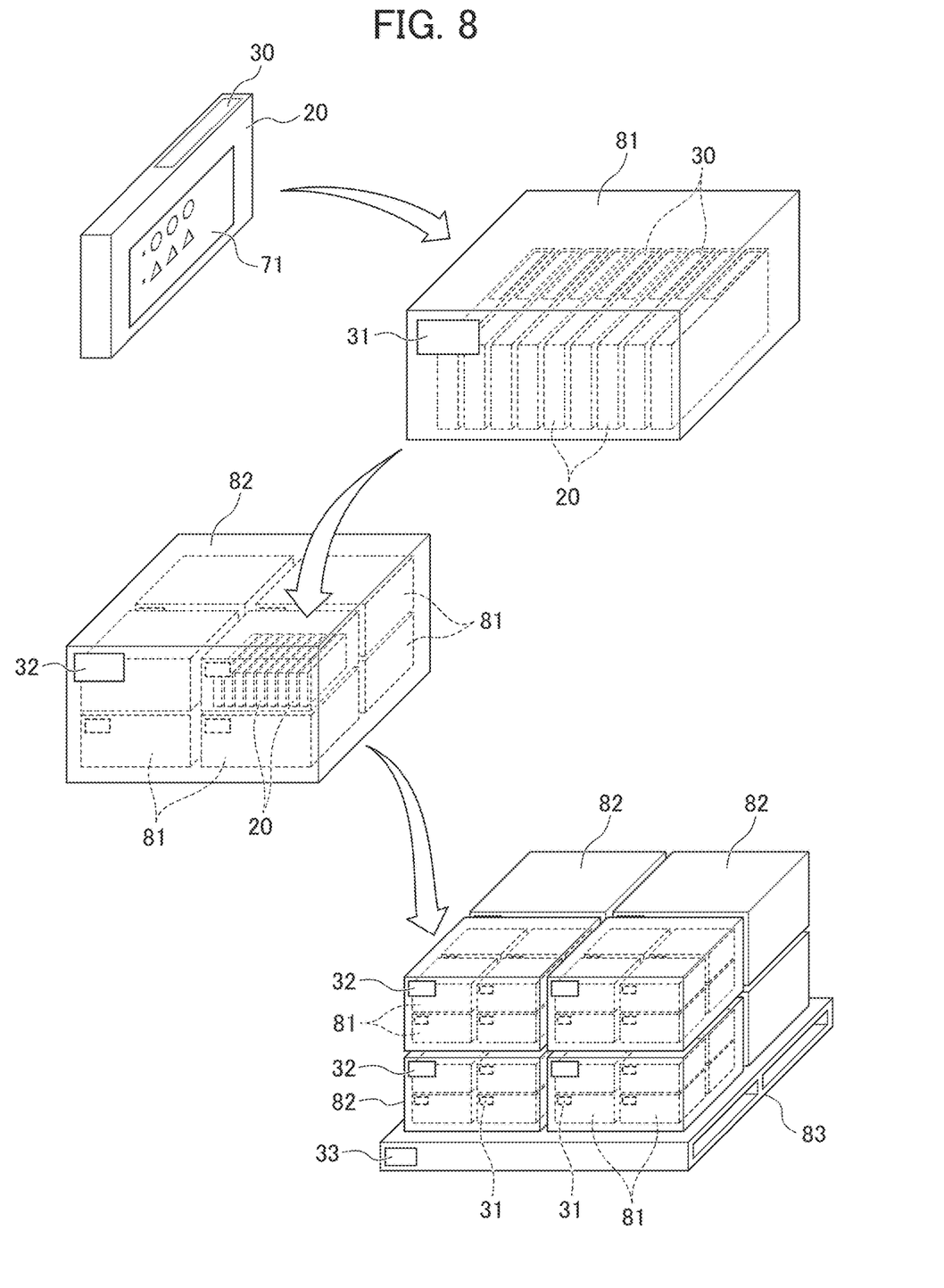
FIG. 8 is a perspective view of an example of a packing method of a plurality of bulk cases when the bulk case is shipped.

The plurality of bulk cases 20 that have been inspected are packaged in boxes and shipped to the manufacturer of assembled products S (Step S110). For example, as shown in FIG. 8, a predetermined number of the bulk case 20 is housed in one exterior box 81, a plurality of exterior boxes 81 are housed in one transport outer box 82 in a two-stage stacked state, and a plurality of transport outer boxes 82 are stacked on a pallet 83.

The exterior boxes 81 each may include the RFID tag 31. The transport outer boxes 82 each may include the RFID tag 32. The pallet 83 may include the RFID tag 33. As a result, information related to the stored bulk cases 20 can be recorded in the RFID tags 31, 32, and 33 for each of the exterior box 81, the transport outer box 82, and the pallet 83, and can be collectively managed by being linked to a plurality of bulk cases 20 packaged.

Figure 9:
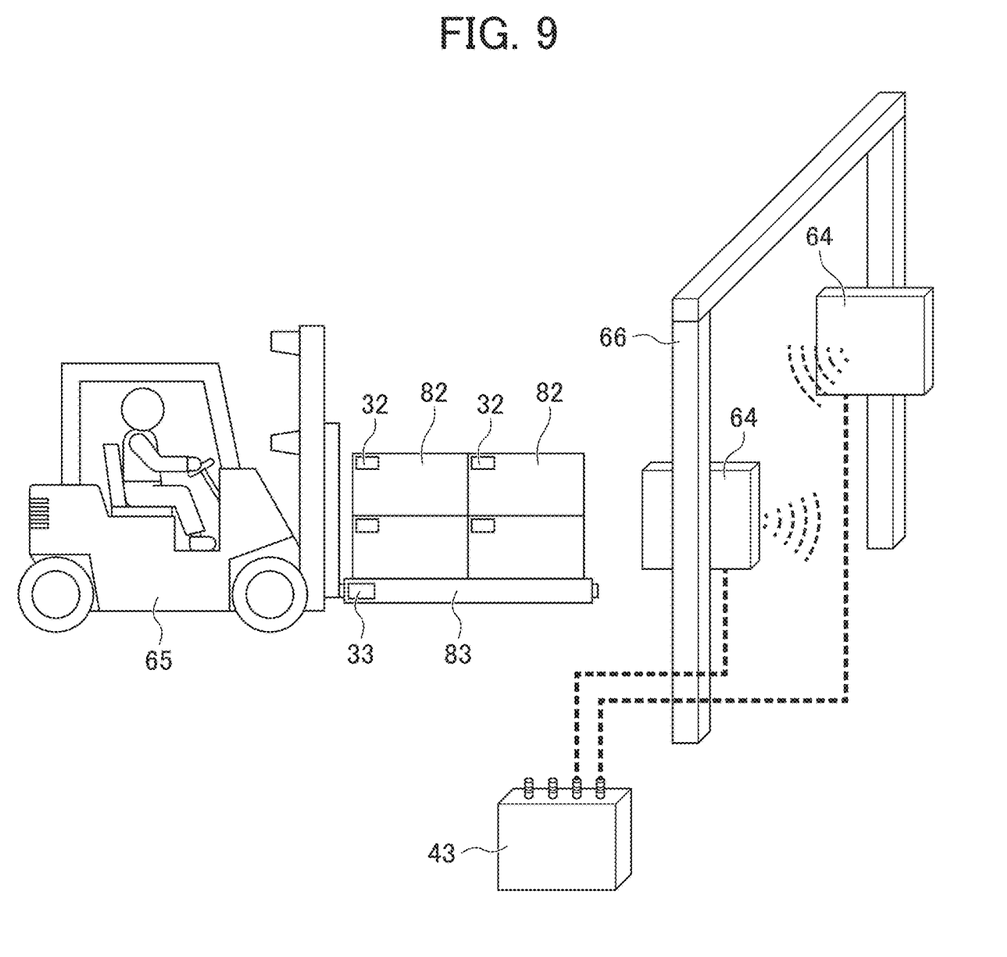
FIG. 9 is a perspective view of a case where RFID tags are read during transportation of a plurality of bulk cases packaged at the time of shipment.

When the plurality of transport outer boxes 82 are stacked on the pallet 83 as described above, the pallet 83 is conveyed to a shipping place by a forklift 65 as shown in FIG. 9. When the forklift 65 passes through the gate 66, the RFID reader 43 reads the RFID tags 31, 32, and 33 via the sensor 64 at the gate 66, thus making it possible to perform shipping management to confirm that the plurality of bulk cases 20 associated with the RFID tags 31, 32, and 33 have been shipped.

Figure 10:
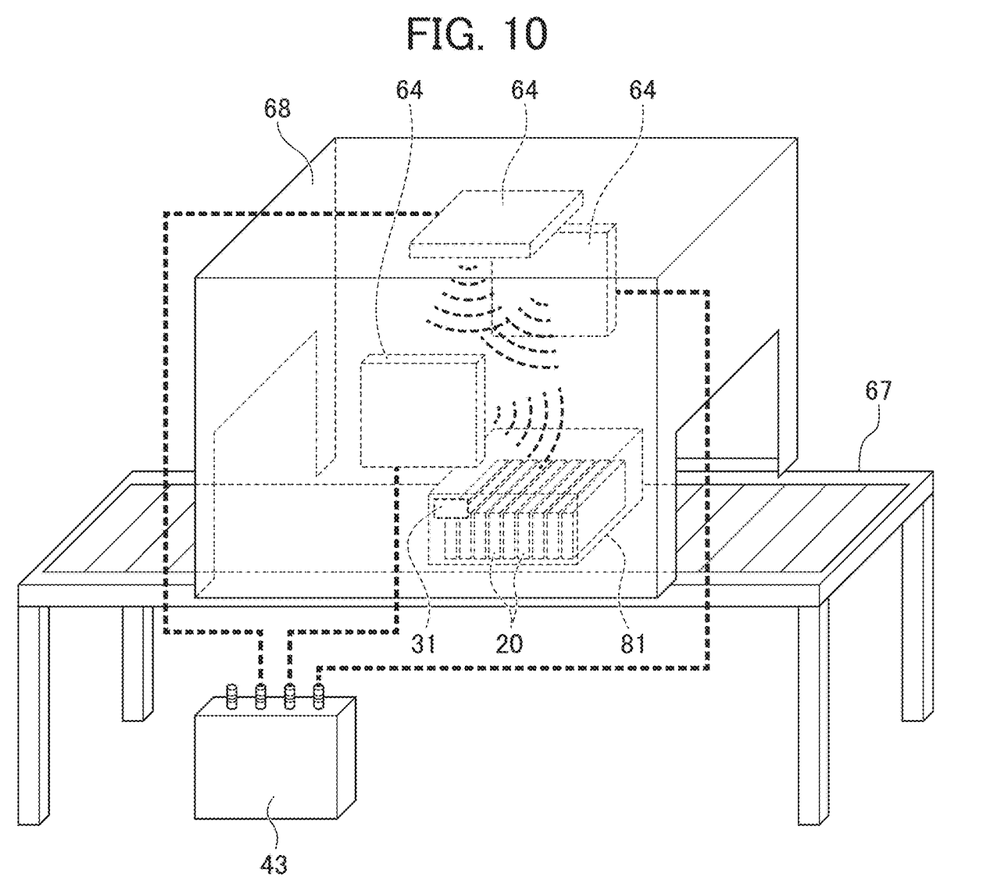
FIG. 10 is a perspective view of another method of reading RFID tags at the time of shipment.

FIG. 10 shows another mode of reading the RFID tag 30 at the time of shipment. In FIG. 10, the RFID reader 43 reads the RFID tag 30 via the sensor 64 at the gate 68 while the exterior box 81 that houses the bulk cases 20 being transported by the transport table 67 is transported in the tunnel-shaped gate 68.

Referring back to FIG. 4, the flow of the electronic components 10 on the side of the manufacturer of assembled products S will be described.

User-side Steps in Manufacturer of Assembled Products S

At the beginning of the receiving process, the bulk cases 20 are shipped to the manufacturer of assembled products S (Step S111). The RFID tag 30 of each of the received bulk cases 20 is read by a predetermined RFID reader 53 of the manufacturer of assembled products S (Step S112). Thus, the shipping management to confirm that the electronic component 10 has been received and the inspection of the electronic components 10 are performed. When a defect occurs in the course of the inspection, the bulk case 20 may be returned to the component manufacturer G.

Predetermined usage side information required by the manufacturer of assembled products S is written in the RFID tag 30 as additional information in each of the plurality of received bulk cases 20 that have been shipped (Step S113). Identification information for use by the manufacturer of assembled products S is written as additional information in each RFID tag 30.

Figure 11:
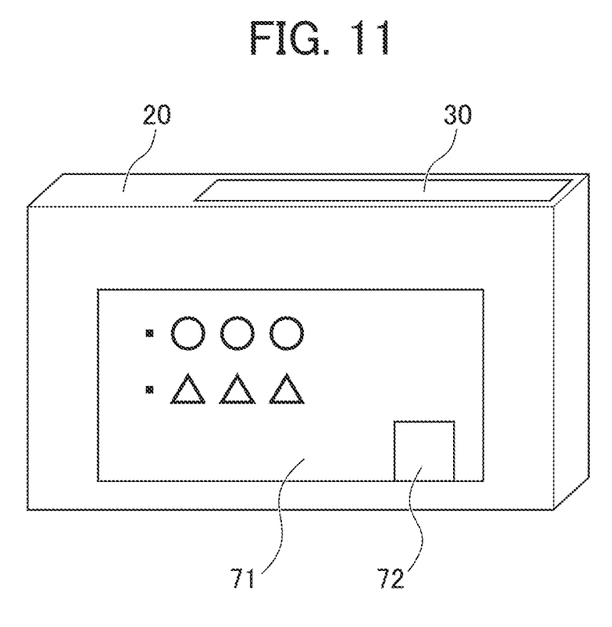
FIG. 11 is a perspective view of a bulk case in which an identification seal is attached to a label on a manufacturer on an assembled products side.

In the present preferred embodiment, as shown in FIG. 11, the unique identification seal 72 on the manufacturer of assembled products S side is attached to the bulk case 20 (Step S114). The identification seal 72 is a seal having one color among the single colors such as, for example, red, blue, and yellow, and may be attached to the label 71. Depending on the color of the identification seal 72, a differentiated procedure in the manufacturer of assembled products S is performed on the bulk case 20. For example, a manufacturing line, a manufacturing order, and the like are selected for each color of the identification seal 72.

In a case where the bulk case 20 is stored in a predetermined storage location or is picked and carried from the storage location before the transition to the manufacturing process in the manufacturer of assembled products S, similarly to the component manufacturer G, the manufacturer-side information and the user-side information of the RFID tag 30 can be read on the manufacturer of assembled products S side to perform, for example, inventory information management, location management, security management, and the like.

In the manufacturing process, each of the bulk cases 20 is dispensed toward the mounter 56 to place the electronic components 10 on the electronic circuit board of the electronic device set, and is set in the component supply device 57. In each component supply device 57, the RFID tag 30 of each of the bulk cases 20 is read to check the components (Step S115). For example, when the bulk case 20 that houses components not suitable for the component supply device 57 is set, the component supply device 57 does not operate, the bulk case 20 is detached from the component supply device 57, and the next bulk case 20 is set.

The electronic components 10 are supplied from the bulk case 20 set in the component supply device 57 to the mounter 56 one by one, and the electronic components 10 are mounted on the electronic circuit board (Step S116). When all of the electronic components 10 in the bulk case 20 are mounted, the empty bulk case 20 is detached from the component supply device 57 and discarded (Step S117). The empty bulk case 20 may be returned to the component manufacturer G for reuse.

In the processing process after the manufacturing process, for example, the bulk case 20 in which the electronic components 10 remain is stored in a predetermined place as a midway inventory. In this case, the RFID tag 30 of each of the bulk cases 20 is read by the RFID reader 53, and the remaining amount is managed for the bulk case 20 in the middle inventory (Step S118).

In addition, in the processing process, by reading the RFID tag 30 of the bulk case 20, it is possible to perform manufacturing tendency management based on, for example, the kind of the electronic component 10 to be used, the amount of the electronic device set to be manufactured, and security management of the bulk case 20. The additional information in Step S113 and the user-side information required in Step S118 may be stored in the cloud 60. The additional information in Step S113 stored in the cloud 60 and the user-side information required in Step S118 may be accessible from the component manufacturer G side. By making accessible from the component manufacturer G side, the component manufacturer G can grasp the specification mode and inventory information of the manufacturer of assembled products S, so that it is possible to predict in advance the request of the manufacturer of assembled products S, and thus it is possible to flexibly deal with the request of the manufacturer of assembled products S. Data stored on the cloud 60 may be stored using a block chain. The use of the block chain makes it difficult to tamper with the data stored on the cloud 60, thus increasing the reliability of the data stored on the cloud 60.

According to the present preferred embodiments described above, the following advantageous effects are achieved. The electronic component management method of the electronic components 10 according to the present preferred embodiment includes the manufacturer-side steps performed at the component manufacturer G that manufactures electronic components 10, the steps including housing a plurality of electronic components 10 in the bulk case 20 defining and functioning as a housing body that houses the plurality of electronic components 20 and includes the RFID tag 30, writing at least one piece of manufacturer-side information related to the plurality of electronic components 10 housed in the bulk case 20 in the RFID tag 30, and shipping the bulk case 20 in which the manufacturer-side information is written in the RFID tag 30 and the plurality of electronic components 10 are housed, and user-side steps performed at the manufacturer of assembled products S defining and functioning as a user-side facility that uses the plurality of electronic components 10, the steps including receiving the shipped bulk case 20, reading the manufacturer-side information written in the RFID tag 30, providing an electronic circuit board, and placing each of the plurality of electronic components 10 on the electronic circuit board based on the read manufacturer-side information.

With such a configuration, it is possible to provide various management processes at least on the component manufacturer G side by using the RFID tag 30 included in the bulk case 20 for the bulk case 20 in which the plurality of electronic components 10 are housed. In the present preferred embodiment, it is also possible to provide various management processes by using the RFID tag 30 on the manufacturer of the assembled products S side where the bulk case 20 including the RFID tag 30 is received. Furthermore, it is possible, by using the RFID tag 30, to manage the components from the component manufacturer G to the manufacturer of assembled products S in a consistent manner.

In the present preferred embodiment, the manufacturer-side information recorded in the RFID tag 30 includes, for example, at least one of the lot number of the electronic component 10, the amount of the electronic components 10 stored in the bulk case 20, the product information relating to the electronic component 10, the environmental information relating to the electronic component 10, the ID number of the bulk case 20, or the inspection number of the electronic component 10.

This makes it possible to manage the electronic components 10 for each bulk case 20 with respect to the amount of the electronic components 10, the product information related to the electronic components 10, the environmental information relating to the electronic components 10, the ID number of the bulk case 20, the inspection number of the electronic components 10, and the like.

In the present preferred embodiment, the manufacturer-side information recorded in the RFID tag 30 further includes the part number for use in the manufacturer of assembled products S, the order number from the manufacturer of assembled products S, the factory number of the component manufacturer G, the date related to manufacturing, the vendor number, and the like.

With such a configuration, it is possible to manage the electronic components 10 for each bulk case 20 with respect to the part number for use in the manufacturer of assembled products S, the order number from the manufacturer of assembled products S, the factory number of the component manufacturer G, the date of manufacturing, the vendor number, and the like. Furthermore, it is possible to record the history of the electronic component information used for the electronic device set.

In the present preferred embodiment, the user-side steps further includes writing additional information in the RFID tag 30.

With such a configuration, it is possible to newly add information necessary for the manufacturer of assembled products S to the RFID tag, and thus, it is possible to perform management using the RFID tag 30 at the manufacturer of assembled products S.

In the present preferred embodiment, the additional information written to the RFID tag 30 by the manufacturer of assembled products S includes a unique ID for use in the manufacturer of assembled products S.

With such a configuration, it is possible for the manufacturer of assembled products S to perform the solid identification, tracking management, and the like of the bulk case 20 for each bulk case 20 in association with the database server 54.

In the present preferred embodiment, the manufacturer-side steps further include storing in the database server 44 the manufacturer-side information written in the RFID tag 30 by the component manufacturer G in the cloud 60 on the Internet and the additional information written in the RFID tag 30 by the manufacturer of assembled products S in the database server 44, and storing in the database server 54 at the component manufacturer G and the manufacturer of assembled products S, in which, at the component manufacturer G and the manufacturer of assembled products S, the manufacturer-side information and the additional information are readable from database servers 44 and 54.

With such a configuration, it is possible for the component manufacturer G and the manufacturer of assembled products S to know the information related to the other party side by accessing the cloud 60. Therefore, for example, it is possible for the component manufacturer G to perform the prediction operation of appropriately adjusting the manufacturing pace of the electronic components 10 by grasping the inventory status of the electronic components 10 at the manufacturer of assembled products S.

In the present preferred embodiment, the manufacturer-side steps further include reading the manufacturer-side information from the database server 44.

With such a configuration, it is possible to manage the electronic components 10 for each bulk case 20 based on the information unique to the component manufacturer G recorded in the database server 44. The database server 44 need not necessarily be used, and all information may be exchanged via the RFID tag.

The bulk case 20 defining and functioning as the housing body of the present preferred embodiment includes the plurality of electronic components 10 manufactured by the component manufacturer G, which is a manufacturer, housed therein, and the RFID tag 30 that records at least one piece of the manufacturer-side information related to each of the plurality of electronic components 10, in which the component manufacturer G manages the product information of the plurality of electronic components 10 based on the manufacturer-side information, and the manufacturer of assembled products S, which is a user of the plurality of electronic components 10, places each of the plurality of electronic components 10 on an electronic circuit board based on the manufacturer-side information.

With such a configuration, it is possible, by using the RFID tag 30, to manage the plurality of components stored in the bulk case 20 from the component manufacturer G to the manufacturer of assembled products S in a consistent manner.

Although preferred embodiments of the present invention have been described above, the present invention is not limited to the above-described preferred embodiments, and modifications, improvements, and the like are included in the present invention as long as the advantages and benefits of the present invention can be achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. An electronic component management method comprising:
    manufacturer-side steps performed at a manufacture side facility that manufactures electronic components, the steps including:
        housing a plurality of electronic components in a housing body that includes an RFID tag;
        writing at least one piece of manufacturer-side information related to the plurality of electronic components housed in the housing body in the RFID tag; and
        shipping the housing body in which the manufacturer-side information is written in the RFID tag and the plurality of electronic components are housed; and
    user-side steps performed at a user-side facility that uses the plurality of electronic components, the steps including:

receiving the shipped housing body;
reading the manufacturer-side information written in the RFID tag;
providing an electronic circuit board; and
placing each of the plurality of electronic components on the electronic circuit board based on the read manufacturer-side information; wherein
the housing body is a bulk case in which the plurality of electronic components are housed in a loose state;
the RFID tag includes an elongated adhesive seal provided on the RFID tag; and
the RFID tag is attached inside of the bulk case.

2. The electronic component management method according to claim 1, wherein the manufacturer-side information includes at least one of a lot number of each of the plurality of electronic components, an inspection number of the plurality of electronic components, or an ID number of the housing body.

3. The electronic component management method according to claim 1, wherein the manufacturer-side information includes a part number to be used in the user-side facility, an order number from the user, a factory number of the manufacturer, a date relating to manufacturing, and a vendor number.

4. The electronic component management method according to claim 1, wherein the user-side steps further include writing additional information in the RFID tag.

5. The electronic component management method according to claim 4, wherein the additional information includes a unique ID to be used in the user-side facility.

6. The electronic component management method according to claim 4, wherein
the manufacturer-side steps further include storing, in a server, the manufacturer-side information written in the RFID tag in the manufacturer-side facility;
the user-side steps further include storing, in the server, the additional information written in the RFID tag in the user-side facility; and
the manufacturer-side information and the additional information are readable from the server in the manufacturer-side facility and the user-side facility.

7. The electronic component management method according to claim 1, wherein the manufacturer-side steps further include reading the manufacturer-side information from a database.

8. The electronic component management method according to claim 1, wherein the bulk case is made of resin.

9. The electronic component management method according to claim 1, wherein the bulk case houses several thousands to several tens of thousands of the electronic components.

10. The electronic component management method according to claim 1, wherein the electronic components are each at least one of a capacitor or an inductor.

11. The electronic component management method according to claim 1, wherein the RFID tag is a passive transponder including a rectangular or substantially rectangular sheet.

12. An electronic component housing body comprising:
a plurality of electronic components manufactured by a manufacturer housed therein; and
an RFID tag to record at least one piece of manufacturer-side information related to each of the plurality of electronic components; wherein
the electronic component housing body is a bulk case in which the plurality of electronic components are housed in a loose state;
the RFID tag includes an elongated adhesive seal provided on the RFID tag;
the RFID tag is attached inside of the bulk case;
the manufacturer manages product information of the plurality of electronic components based on the manufacturer-side information; and
a user of the plurality of electronic components places each of the plurality of electronic components on an electronic circuit board based on the manufacturer-side information.

13. The electronic component housing body according to claim 12, wherein the bulk case is made of resin.

14. The electronic component housing body according to claim 12, wherein the bulk case houses several thousands to several tens of thousands of the electronic components.

15. The electronic component housing body according to claim 12, wherein the electronic components are each at least one of a capacitor or an inductor.

16. The electronic component housing body according to claim 12, wherein the RFID tag is a passive transponder including a rectangular or substantially rectangular sheet.

* * * * *